Figure 1:
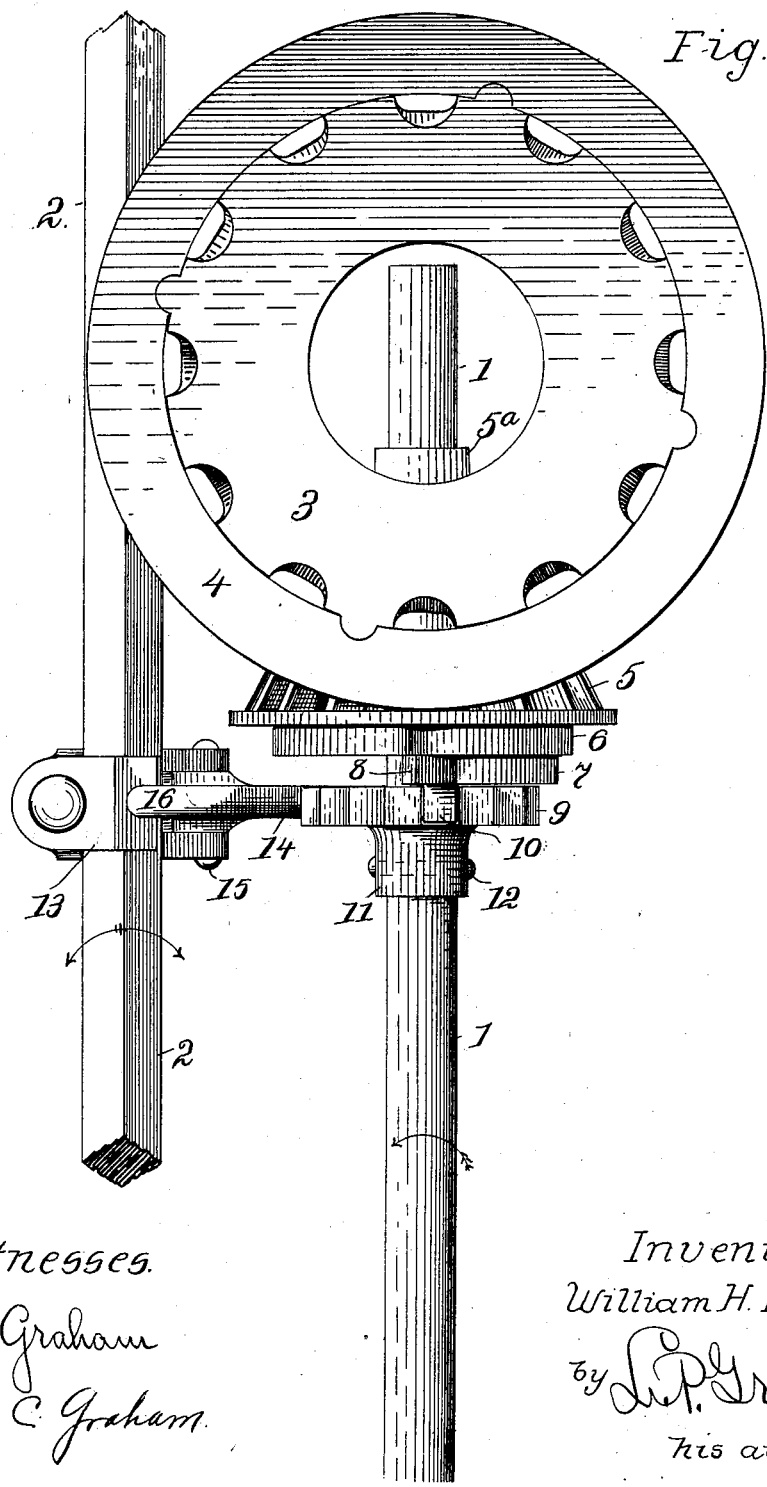

No. 734,359. PATENTED JULY 21, 1903.
W. H. PARLIN.
CORN PLANTER.
APPLICATION FILED APR. 8, 1903.
NO MODEL. 2 SHEETS—SHEET 1.

Witnesses.
Fay Graham
Ina C. Graham.

Inventor.
William H. Parlin.
by L. P. Graham
his attorney.

No. 734,359. PATENTED JULY 21, 1903.
W. H. PARLIN.
CORN PLANTER.
APPLICATION FILED APR. 8, 1903.
NO MODEL. 2 SHEETS—SHEET 2.

Witnesses
Fay Graham
Ira C. Graham

Inventor.
William H. Parlin,
by L. P. Graham
his attorney.

No. 734,359. Patented July 21, 1903.

UNITED STATES PATENT OFFICE.

WILLIAM H. PARLIN, OF CANTON, ILLINOIS, ASSIGNOR TO PARLIN & ORENDORFF COMPANY, OF CANTON, ILLINOIS, A CORPORATION OF ILLINOIS.

CORN-PLANTER.

SPECIFICATION forming part of Letters Patent No. 734,359, dated July 21, 1903.

Application filed April 8, 1903. Serial No. 151,671. (No model.)

*To all whom it may concern:*

Be it known that I, WILLIAM H. PARLIN, of the city of Canton, county of Fulton, and State of Illinois, have invented certain new and useful Improvements in Corn-Planters, of which the following is a specification.

This invention relates to planters in which the seed-plates are driven from the drill-shaft at times and to extents controlled through the check-row shaft.

The principal object of the invention is to minimize jar, wear, and work by diminishing the mass that is started and stopped at each hill-dropping action of the seed-plates.

Other objects are obvious from the detailed description.

The invention is exemplified in the structure hereinafter described, and it is defined in the appended claims.

In planters of the class to which this invention relates it has been customary heretofore to gear each seed-plate with the drill-shaft, so that whenever the drill-shaft turns the seed-plates will turn also and to control the rotation of the drill-shaft through the check-row shaft. This has necessitated the use of a strong heavy clutch between the drive-pinions of the seed-plates and has imperatively demanded that both seed-plates shall be timed in unison with each other and with the clutch. There are some disadvantages in that form of construction and mode of operation which I have been able to obviate by mounting the drive-pinions of the seed-plates loosely on the drill-shaft, permitting the drill-shaft to run continuously, and compelling the pinions to partake of the motion of the drill-shaft at times controlled through the check-row shaft.

One advantage of the present plan is the direct control of each individual seed-plate and a certain independence in timing resulting from such direct control. Another advantage lies in reducing the mass that is started and stopped at each hill-dropping action of the seed-plate. A hill-dropping action of a seed-plate is made about once in a second. The motion consumes less than a second, and under the old style of planting the entire plate-actuating mechanism, including the drill-shaft, is started and stopped at each hill-dropping action of the seed-plates. The drill-shaft extends from one seed-plate to the other, it must be strong enough to impart motion to both seed-plates without yielding to torsional stress, and its mass constitutes a very considerable part of the entire weight that is started and stopped when the seed-plates are advanced a hill-dropping space. By running the drill-shaft continuously the work of starting and stopping the seed-plates is much reduced and the machinery is relieved to a large extent of a detrimental jar. Moreover, the application of force from the drill-shaft to the seed-plates through clutches connecting the drill-shaft directly with the pinions of the seed-wheels permits the use of clutch mechanism on the drill-shaft so light that the weight of two clutches aggregates less than the weight ordinarily embodied in a single intermediate clutch, and the mass to be stopped and started is thus still further reduced.

Figure 2:
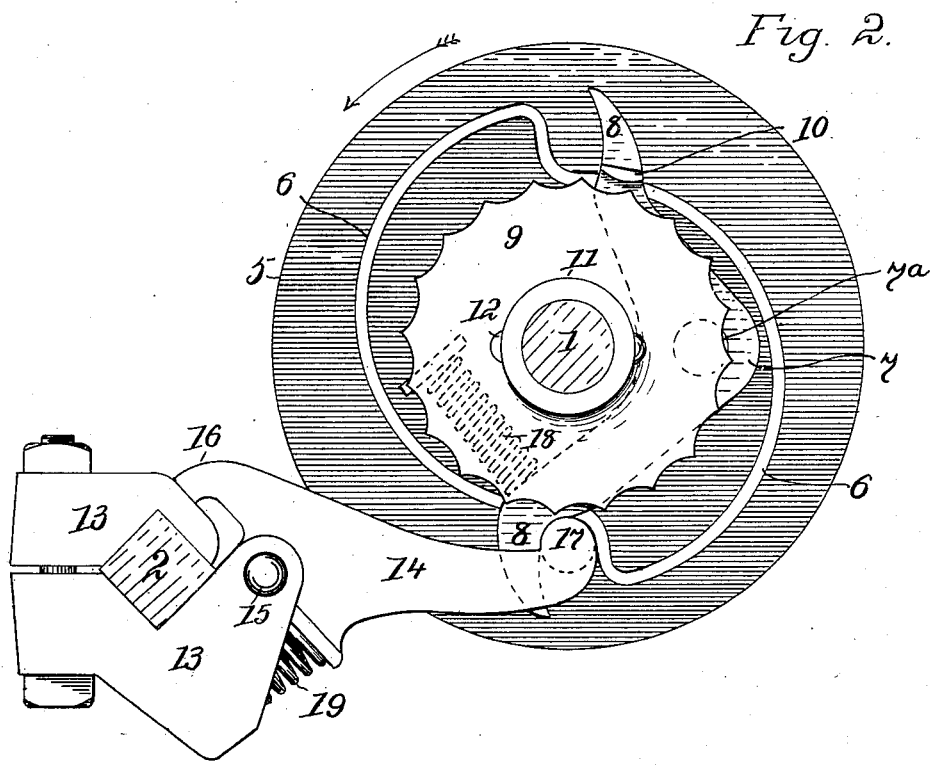

In the drawings forming part of this specification, Figure 1 is a plan of so much of a planter as is needed to explain my invention, and Fig. 2 is an enlarged side elevation of a clutch and the adjuncts thereof.

A drill-shaft is shown at 1, a check-row shaft at 2, a seed-plate at 3, and a seed-wheel at 4. The drive-pinion 5 of the seed-wheel has a hub $5^a$, which is journaled loosely on the drill-shaft. A cam 6 is formed on or attached to the outer face of the drive-pinion. A pawl 7 is pivotally connected at $7^a$ with the pinion. It has extensions 8, through which it is controlled. It has a lateral stud 10, adapted to engage a ratchet-wheel on the drill-shaft, and a spring 18 tends to hold the stud in engagement with the ratchet-wheel. The ratchet-wheel 9 has a hub 11, which is fixed onto the drill-shaft by a pin 12 in this instance, and the perimeter of the ratchet-wheel is preferably corrugated or provided with a multiplicity of concave depressions, with any one of which the stud of pawl 7 may engage. The check-row shaft 2 has a clip 13. A throw-out pawl 14 is pivoted to the clip at 15. A stop extension 16 of the pawl bears against the clip to limit upward swing of the pawl, and a spring 19 tends to hold the extension 16 in contact with the clip. A pin 17 extends laterally from the swinging end of the pawl and normally bears against cam 6 in the path of extensions 8 of pawl 7.

Fig. 2 of the drawings represents the stud 10 of pawl 7 held out of contact with the ratchet-wheel by pin 17 of the throw-out pawl, and the drive-pinion remains at rest, while the drill-shaft and the ratchet-wheel thereon rotates. When the check-row shaft is rocked sufficiently far to carry the pin 17 clear of an extension 8 of pawl 7, the spring 18 will rock the pawl on its eccentric pivot 7ª and force the stud 10 into engagement with the ratchet-wheel. The action of the check-row shaft is quick, as is well understood, and by the time the drive-pinion has made a semirotation the pin 17 will be in place to intercept an extension of pawl 7 and force the pawl from engagement with the ratchet-wheel. The drill-shaft is of the well-known class that receives motion from the travel of the planter, and the check-row shaft is, as its name implies, adapted to be rocked at cross-rows by a knotted wire or other outside influence. In this case the drive-pinion is geared to turn one-half around while the seed-plate is making an operative movement; but this is optional and variable. If the drill-shaft should make a complete rotation, or any part of a rotation other than one-half, while the seed-plate is receiving the motion needed to drop a hill from the seed-cells, the result, so far as my invention is concerned, would be the same, or substantially so.

The form of clutch herein shown and described is a desirable but not indispensable one, as the essential requirement is that the drive-pinion shall be loosely journaled on the drill-shaft, that the drill-shaft shall be driven continuously from the travel of the planter, and that connections shall be made and broken between the drive-pinion and the drill-shaft through the intervention of the check-row shaft.

But one drive-pinion and clutch are shown herein, as the conditions are the same for each seed-plate, and the representation of the opposite seed-plate and adjuncts would be mere duplication.

I claim—

1. In a corn-planter, the combination of a drill-shaft, a seed-wheel, a pinion loosely journaled on the drill-shaft and geared with the seed-wheel, and means for connecting the pinion with the drill-shaft at intervals.

2. In a corn-planter, the combination of a drill-shaft, a seed-wheel, a pinion loosely journaled on the drill-shaft and geared with the seed-wheel, a clutch to connect the pinion with the drill-shaft and means for actuating the clutch at intervals.

3. In a corn-planter, the combination of a drill-shaft, a seed-wheel, a pinion loosely journaled on the drill-shaft and geared with the seed-wheel, a ratchet-wheel fastened to the drill-shaft, a pawl pivotally connected with the pinion and adapted to engage the ratchet-wheel and a throw-out pawl to detach the pawl of the pinion from the ratchet-wheel of the drill-shaft.

4. In a planter, the combination of a drill-shaft, a check-row shaft, a seed-wheel, a pinion loosely journaled on the drill-shaft and geared with the seed-wheel, a ratchet-wheel fastened to the drill-shaft, a pawl pivotally connected with the pinion, a spring tending to hold the pawl of the pinion in engagement with the ratchet-wheel, and a throw-out pawl on the check-row shaft to detach the pawl of the pinion from the ratchet-wheel of the drill-shaft.

In testimony whereof I sign my name in the presence of two subscribing witnesses.

WM. H. PARLIN.

Witnesses:
H. C. TUXBURY,
W. C. WARREN.